United States Patent [19]

Ward

[11] 4,152,691

[45] May 1, 1979

[54] SEISMIC RECORDING METHOD USING SEPARATE RECORDING UNITS FOR EACH GROUP

[75] Inventor: Phillip W. Ward, Dallas, Tex.

[73] Assignee: Texas Instruments Incorporated, Dallas, Tex.

[21] Appl. No.: 836,633

[22] Filed: Sep. 26, 1977

Related U.S. Application Data

[62] Division of Ser. No. 282,634, Aug. 21, 1972.

[51] Int. Cl.$^2$ ............ G01V 1/16; G01V 1/28
[52] U.S. Cl. ............ 340/15.5 FC; 340/15.5 GC; 340/15.5 DP; 340/347 AD
[58] Field of Search ......... 340/15.5 TS, 15.5 CP, 340/15.5 GC, 15.5 DP, 15.5 MC, 347 AD, 15.5 FC

[56] References Cited

U.S. PATENT DOCUMENTS

| | | | |
|---|---|---|---|
| 2,950,469 | 8/1960 | Raasch | 340/347 AD |
| 3,062,315 | 11/1962 | Herzog | 340/15.5 TS |
| 3,134,957 | 5/1964 | Foote et al. | 340/15.5 TS |
| 3,283,295 | 11/1966 | Montgomery | 340/15.5 TS |
| 3,329,950 | 7/1967 | Shafer | 340/347 AD |
| 3,419,853 | 12/1968 | Silverman | 340/15.5 CP |
| 3,436,752 | 4/1969 | Phil | 340/347 AD |
| 3,458,721 | 7/1969 | Maynard | 340/347 AD |
| 3,467,958 | 9/1969 | McKinney | 340/347 AD |
| 3,699,567 | 10/1972 | Kiyasu | 340/347 AD |
| 3,742,489 | 10/1971 | Lefevre | 340/347 AD |
| 3,748,638 | 7/1973 | Montgomery, Jr. et al. | 340/15.5 TS |

FOREIGN PATENT DOCUMENTS

812432 4/1959 United Kingdom ............ 340/347 AD

*Primary Examiner*—Howard A. Birmiel
*Attorney, Agent, or Firm*—Melvin Sharp; Rene' E. Grossman; Thomas G. Devine

[57] ABSTRACT

A system of land (field) seismic exploration which eliminates the requirement for a main land cable to transmit seismic data from the sensors to a central recorder is disclosed. The system includes: a seismic source for generating seismic energy; a data acquisition unit for collecting seismic information; and a master control and collating unit for transmitting coded identification and command signals to the source and data acquisition units and collating the data from the individual tapes of the data acquisition units. Each data acquisition unit includes its own controller, sensor group, analog to digital converter, signal conditioner data recorder, and radio frequency receiver. The analog to digital converter includes a plurality of bounded amplifiers to provide a number of fixed gain stages operative throughout a 120 db dynamic range. The signal conditioner includes a large scale integrated metal oxide semiconductor chip processor for performing desired seismic data processing functions.

10 Claims, 6 Drawing Figures

K = NUMBER OF FIXED GAIN STAGES
N = INDEPENDENT PRECISION (BITS)
R = REDUNDANCY (BITS)

FIXED POINT RANGE = M = R + K (N-R)

SEISMIC RECORDING METHOD USING SEPARATE RECORDING UNITS FOR EACH GROUP

This a division, of application Ser. No. 282,634, filed Aug. 21, 1972.

This invention relates to seismic exploration and more particularly it relates to a system for land (field) seismic exploration.

In the past land seismic exploration systems have included a plurality of seismic sensors or sensor groups having their outputs coupled through a multipair conductor containing seismic land cable to a central data recorder. This system, because of the central data recorder has become known as a centralized system.

More specifically the centralized system includes a source of seismic energy, and a plurality of seismic sensors for location at known positions in an exploration area. The seismic sensors are electrically connected to electrical conductors contained in a land seismic cable. The outputs of the electrical conductors of the land cable are connected to the input of an analog section whose output is to a digital section. The analog section includes for each sensor frequency filters to obtain desired frequencies, an amplifier having programmed or automatic gain control to keep the desired output signal constant despite the variations in input signal strength, a camera or cathode ray tube for visual display of the desired detected signals for purposes of quality control, and a digital section. The digital section includes a multiplexer which is operative pursuant to a time control for sampling each sensor output. The sampled sensor signals of the multiplexer are converted from analog type signals to digital type signals by an analog to digital (A/D) converter and passed through read-write amplifiers for recording on a digital tape.

The centralized system is deployed as follows. A field survey party is provided a preplot of a desired exporation area often referred to as the prospect. The survey party, using the preplot, locates and marks the sensor or sensor group positions, the source positions or trajectory, and a control unit position. A seismic field crew follows the surveying party to position up to 60 sensors or sensor groups at the marked sensor positions, a seismic energy source at the source positions, and a control unit which includes the data processing and recording instruments which may be separated physically from the control unit. A main land cable is laid between the sensors or sensor groups and the control unit and the sensors or sensor groups and the recorder instrumentation of the control unit are connected to the land cable. The control center then makes proper shot identification on the recording tape and actuates the source one or more times to generate seismic energy for a seismogram. The sensors detect the seismic energy directly and any reflected or diffracted energy. This energy is transmitted by the multipair conductor seismic land cable to the recorder instrumentation. Each sensor or sensor group output is sampled by a multiplexer, digitized, and recorded on magnetic tape of a tape transport capable of handling up to 60 input channels. The seismic system is then moved forward to the next location and the procedure repeated.

Problems attending the use of the centralized system stem from the use of a seismic land cable, and from the processing of the multiplexed data recorded on the magnetic tape. The seismic land cable is an expensive piece of equipment to manufacture, maintain, and deploy in the field. Its great length, and bulk requires specialized collection and transport equipment and additional labor for laying and retrieving operations. Any system of multiplexing has upper limits on the number of sensors or sensor groups which can be used and the multiplexed raw data must be demultiplexed for processing the end product, the seismogram.

Thus, it is an object of this invention to provide an efficient and economical system for land seismic exploration.

Another object of the invention is to provide a system for land seismic exploration which eliminates the requirement for a seismic land cable in the data acquisition system.

A further object of the invention is to provide a system for land seismic exploration having a recording system compatible directly with the central data processing unit in that raw data is collected in demultiplexed form.

Still another object of the invention is to provide a land seismic data collection system having an independent data acquisition unit for each sensor group deployed.

Yet another object of the invention is to provide a distributed seismic data recording system utilizing a minimum number of bits per record by a better match to the information content of the data.

Still yet another object of the invention is to minimize the number of analog operations on data and to maximize the number of digital functions using integrated circuits.

Briefly stated this invention comprises a distributed system for land seismic exploration. A distributed system is essentially a centralized land data exploration system with each sensor or sensor group having a separate data acquisition unit replacing the land seismic cable and the central recorder of the centralized land data exploration system. Thus, the distributed land seismic exploration system comprises a source of seismic energy, a plurality of data acquisition units and a master control unit.

These and other objects and features of the invention will become more readily understood in the following detailed description taken in conjunction with the drawings.

Figure 1:
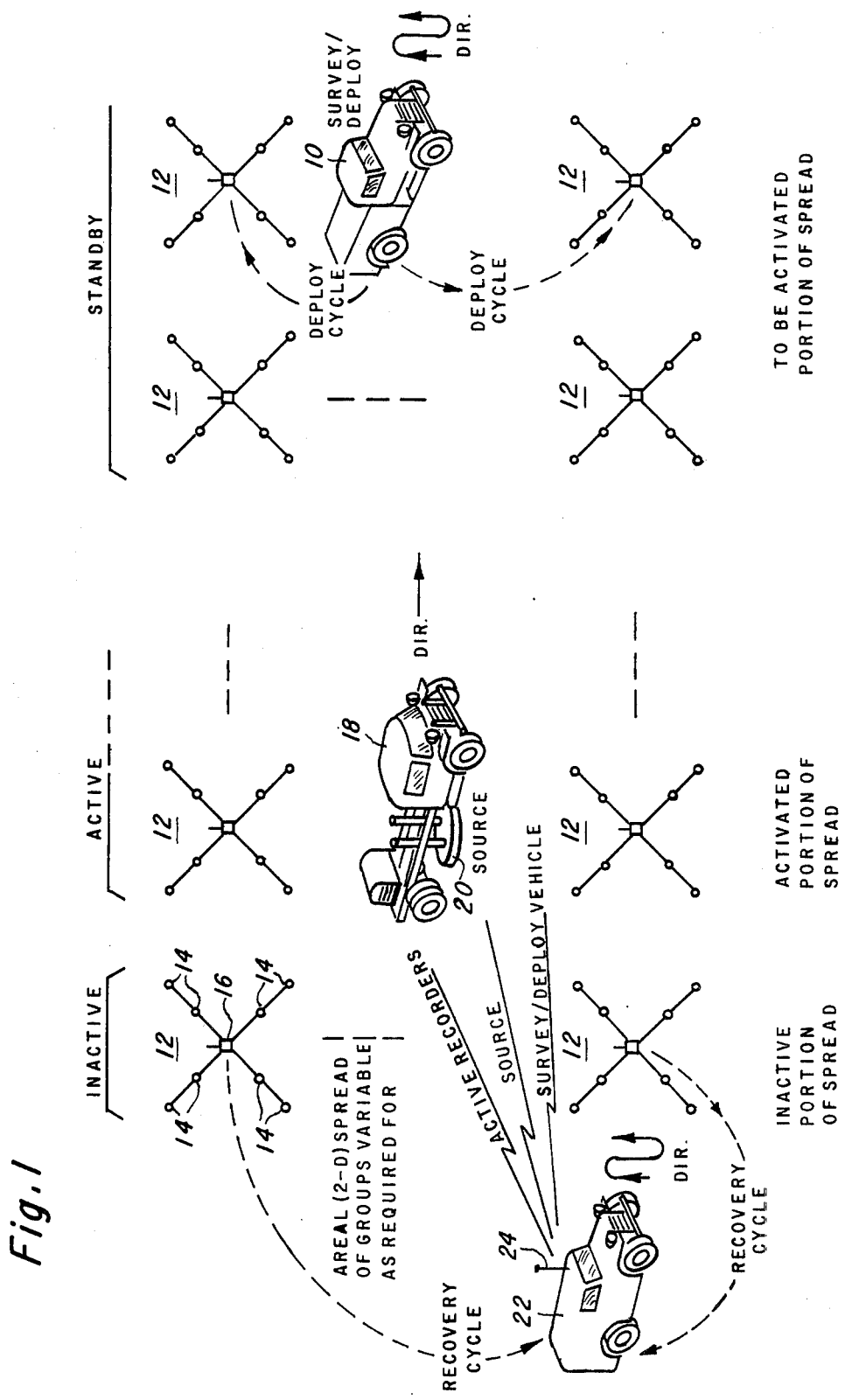
FIG. 1 is an illustration of the portable distributed seismic land exploration system constituting an embodiment of the invention.

Referring to the drawings, the portable distributed land seismic exploration system embodiment of the invention is shown in FIG. 1 and comprises a first mobile vehicle 10 moving through a surveyed exploration area with a crew to position data acquisition units 12, hereinafter described, including sensors or sensor groups 14 at marked locations for a one, two, or three dimensional data acquisition. The sensor groups may consist of one or more geophones or detectors 14 which may be either of two types—motion sensitive or pressure sensitive. The Geo Space (Hall-Sears) HS-J Subminiature Land Detector is a suitable detector for use in a sensor group. The geophones 14 are arranged in strings of two or more and may be connected in either a series or series-parallel arrangement. Although a four point star shaped array with two detectors 14 per arm is shown (FIG. 1) extending from a centrally positioned radio frequency transreceiver 16, a nine point star shaped array with six elements per arm produces excellent results as does a discrete areal array of a 4×4 square. After each data acquisition unit 12 is properly positioned, it is activated and placed in a standby mode of operation. The identification and location of each data acquisition unit is reported to a master control and collation unit 24, hereinafter described.

The mobile vehicle 10 bearing the data acquisition unit deployment crew is followed by a second mobile vehicle 18 bearing a field crew for positioning a seismic source 20 at marked locations along the source trajectory established by the survey party. With the seismic source 20 properly located, master control 24, located in truck 22, is informed which then transmits coded signals to the acquisition units 12 for changing the standby mode of selected sensor groups to the active mode and to the seismic source 20 for activating the seismic source whereby first, header type information is recorded, next the source is activated, and then raw data is collected and recorded by the data acquisition units 12. The seismic source 20 may be any suitable source such as a dynamite source or a nondynamite source shown in FIG. 1. If a dynamite source is used fewer marked source locations are required because of the power of the seismic energy generated. If a nondynamite source is used as many as forty locations between each pair of sensor groups may be required, and because of the poor ground coupling as many as 100 individual recordings must be stacked to obtain a reasonable signal-to-noise ratio. Examples of suitable nondynamite sources are: a mobile gas chamber into which propane and oxygen is fed and exploded against a large mass to couple the explosive energy to the surface of the earth, a device sold under the trademark DINOSEIS; a compressed air gun; a weight dropping machine; or a pulse-compression technique device sold under the trademark VIBROSEIS. The VIBROSEIS possesses one advantage over other land nondynamite sources in that the frequency content of the input signal is known and controllable; this greatly aids in rejecting unwanted energy. However, the pulse duration (7 seconds) permits the buildup of strong surface waves, the effect of which is greatly alleviated by the use of the above suggested sensor group deployment patterns.

The mobile vehicle 18 bearing the source 20 is followed by a third mobile vehicle 22 which bears the master control and collation unit 24 which includes a radio frequency transmitter and receiver and a sensor group recovery crew. As previously mentioned the master control is in two way communication with the field crews and the data acquisition and source units to receive data acquisition unit identification and to transmit activating signals and header information to the data acquisition units 12 and to activate or fire the source 20. After the data acquisition units 12 (now in the active mode) have collected the raw seismic data for their present location, coded radio frequency signals are sent to change the active mode of operation of these seismic groups to an inactive mode of operation. The inactive mode may include generating a locating signal by a homing device included in each data acquisition unit 12 to assist the recovery crew in collecting the inactive data acquisition units 12. The recovered data acquisition units 12 (after the recovery crew replaces the recorded cartridges with fresh data cartridges) are carried to the data acquisition unit deployment mobile vehicle 10 for further use in the exploration area. The recorded data cartridges are fed into the data collation system, hereinafter described, for processing.

Turning now to the data acquisition unit 12 (FIG. 2), the data acquisition unit 12 comprises a signal conditioning unit 30 coupled to the output of the sensor group 14 for conditioning the seismic signals for digitization by an analog to digital converter 32. The signal conditioning unit and A/D converter are actuated when the acquisition unit 12 is placed in active mode. As the data acquisition unit 12 is controlled from the master control unit, hereinafter described, a radio frequency receiver 34 is provided to receive coded signals from the master control. Control commands which modulate an audible tone carrier which in turn modulates an RF carrier (or is transmitted by direct wire) are used to provide the necessary control. The following is a typical example of the control command system. The control commands consist of address commands and group commands. Address commands consist of a basic command followed by a sequence of addresses. All acquisition units receive and remember the basic address command. If the site identification of any acquisition unit appears in the address sequence following the basic command then that acquisition unit obeys the command. Typical address commands are: enter active standby, write identification/status block, enter inactive standby and enter recovery mode. Group commands consist of a basic command which may or may not be followed by a number sequence. Group commands are obeyed by all acquisition units which have been placed in the active standby mode by an address command. The number sequence following the basic group command is recorded as a control variable in the header portion of an event. Typical group commands are: begin shotpoint number (begin recording this event number), timebreak (time when source event took place) and end shotpoint number (cease recording this event number).

The following is a typical example of the bit and word structure used in command transmission. The bit level of information is represented by a Barker code, one unique code each for "one," "zero" and "space" representation. The Barker codes are generated from a primative binary train of logical one and zero bits, typically 128 bits. The primative binary sequence of logical ones and zeros modulate the audible tone carrier as described above. Typical modulation schemes are phase shift keying (PSK) or frequency shift keying (FSK). At the receiver end, the binary sequence is detected bit by bit and continuously correlated with each Barker code pattern for either a "one," "zero" or "space" detection. When there is a correlation above some arbitrary threshold, say 50%, then one bit of control information has been detected. Three Barker code patterns are used to transmit logical "1," logical "0" and "space" information bits. The control commands are structured from these bit patterns arranged in bit serial coded form. Two level phase modulation is used to transmit the Barker code patterns in the tone carrier. This method was chosen based on the low information content required for control and the need for high reliability in the RF link. It will be understood, of course, that other coding and tone modulation methods which use any unique binary coded command set and which, for example, produce a tone modulation can be used. The receiver 34 is electrically coupled to a decoder 36 which demodulates the tone carrier signals and translates them to bit serial digital signals for the control 38. The control 38 is responsive to the decoded signals to address and command the acquisition unit to change the operation mode, i.e., standby, active, inactive, of the acquisition unit 12. When the control 38 receives a signal to place the acquisition unit in an active mode of operation, a switch 40, which may be a solenoid operated mechanical switch, is closed to connect a data recorder 42, which may be, for example, either a data tape cartridge or a cassette tape recorder to a source of power 46. The data recorder may be, for example, a data cartridge type suitable for recording header information, timing signals, and digitized signal output of the analog to digital converter 32. The acquisition unit 12 may be provided with a monitor 44 coupled to the control 38 for testing the operation of the acquisition unit 12 after positioning in the field, but prior to source activation. To aid in recovering the acquisition unit 12, the panel monitor 44 may support a homing device (not shown) such as, for example, a horn or other signaling device having a solenoid controlled switch operative responsive to the control 38 receiving a command to change from the active to inactive stage. The source of power may be, for example, a battery power pack capable of providing operating power to the other electrical elements of the acquisition unit such as the receiver 34, the signal conditioning unit 30, the analog to digital converter 32, and the retrieval signaling device (not shown) as well as the data recorder 42. The power source should be able to support a standby period of 48 hours, and an active period of one and one-half hours. The inactive period is not critical and, if included at all, may be designed to meet the requirements of a desired recovery operation period.

The signal conditioning unit 30 (FIGS. 2 and 4) for the data acquisition unit 12 may be a typical analog signal conditioning unit or a system which comprises a bounded antialiasing filter 50 (FIG. 4) electrically coupled to the output of a seismic sensor group 14 for passing desired frequencies. The desired frequencies are fed to a normalizer 52 to multiply the amplitudes of all seismic signals by a constant so they fall within the operating ranges of a full scale fixed-gain analog to digital (A/D) system 32 with multiple fixed point digital outputs.

Figure 4:
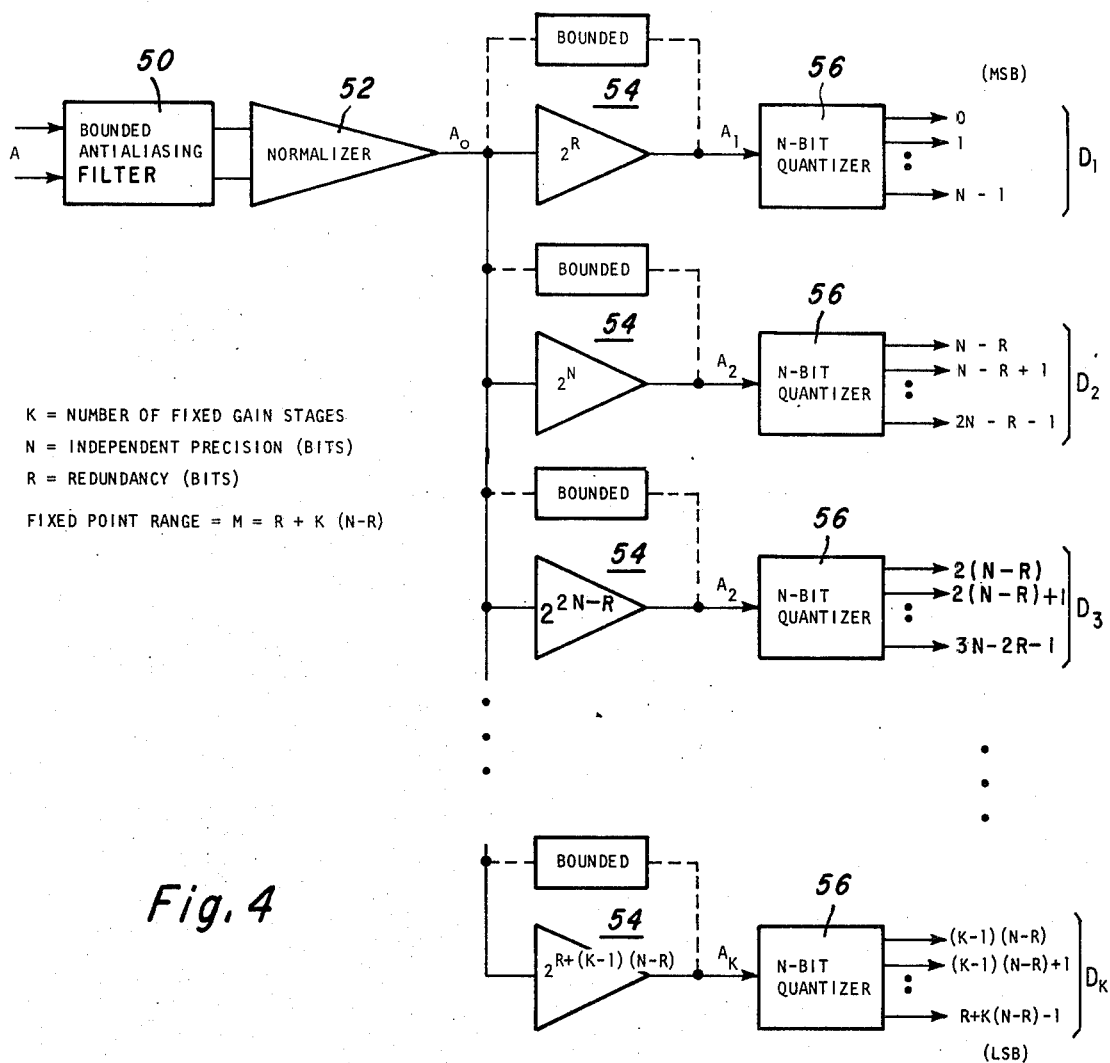
FIG. 4 is a block diagram of a full range fixed gain analog to digital system with multiple fixed point digital outputs.
Figure 5:
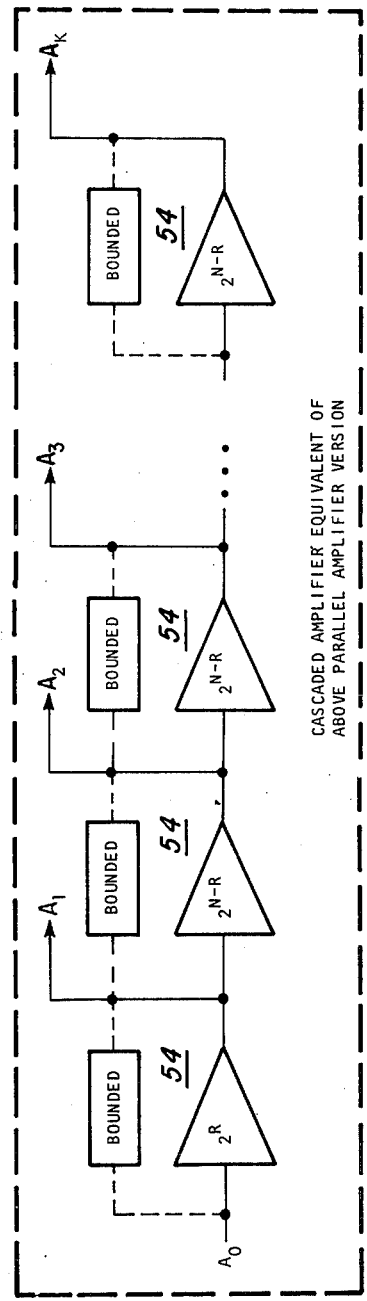
FIG. 5 is a block diagram of another embodiment of the full range, fixed-gain analog to digital system with multiple fixed point digital outputs.

The A/D system 32 comprises a plurality of bounded amplifier stages 54 which are connected either in parallel as shown in FIG. 4 or in series as shown in FIG. 5 to the output of the normalizer 52. The output of each amplifier stage is to a separate N-bit quantizer 56. The series arrangement of the bounded amplifiers (FIG. 5) forms a cascaded amplifier equivalent of the parallel amplifier version (FIG. 4). The bounded amplifier circuit may be any of those shown schematically in Section I. 25, Philbrick Applications Manual, Computing Amplifiers, copyright 1966 by George A. Philbrick Researchers, Inc. A full range system is used in the distributed system, to eliminate the need for personnel to set the gain control. The amplitude ranges of signals encountered in the field regardless of the type of source used is about 120 db; i.e., a million to one ratio between the largest and smallest signals encountered. The number of binary digits (bits) required for the analog to digital converter is determined by assuming that the validity of stacking is based on the superposition principle. Thus the data acquisition system must be a linear, time-invarient system, regardless of the ambient noise level. This means that the smallest signal of interest must be estimated and quantized to a precision which can be considered a linear version of the signal. The minimum precision in bits required to assume amplitude linearity for any single path signal is three. Thus, for the 120 db range 23 bits are the minimum number required to linearly accommodate the floating point mantissa precision between the extremes in decibels of concurrently arriving signals which are to be separated by additive processes (stacking) and to represent the true amplitude, fixed-point representative of seismic data between the extremes in decibels of signals ever to be encountered. A single analog to digital converter cannot handle this requirement; therefore, the arrangement of either FIGS. 4 or 5 is required. The optimum number of amplifier stages 54 constituting the plurality of bounded amplifiers, is determined as follows: Each amplifier stage has its own N-bit quantizer 56; so that each stage linearly represents about 6(N-1) db of signal range. Each quantizer contains a number of bits of redundancy (R) with respect to any adjacent quantizer 56. Thus, each gain stage dynamic range linearly overlaps the adjacent gain stage dynamic range by about 6(R-1) db. The total fixed point range represented is M bits, where $M=R+K(N-R)$. The dynamic range is about 6(M-1) db, but only about 6(N-1) db of this range is always linear. The optimum linear dynamic range per stage is between 42(N=8) and 66(N=12) db. For the full fixed point range (M=23 to 24 bits), the overlap between analog stages is between 12 db (R=3, N=8, M=23) and 42 db (R=8, N=12, M=24). By substituting these values in the formula $M=R+K(N-R)$ and solving for K the number of stages required is four.

Figure 2:
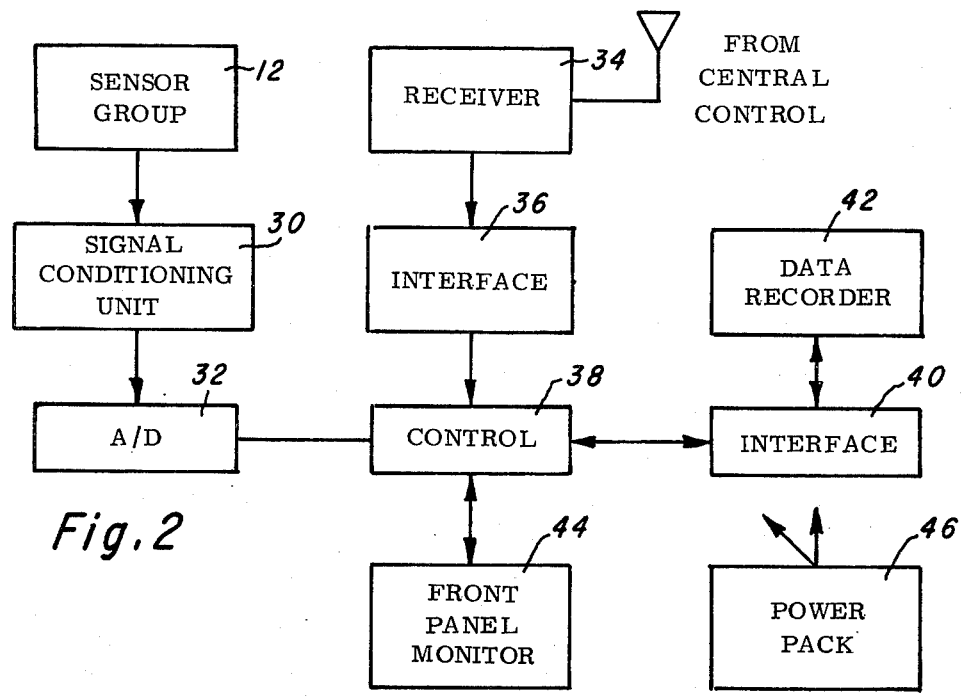
FIG. 2 is a block diagram of a data acquisition unit for the present invention.
Figure 6:
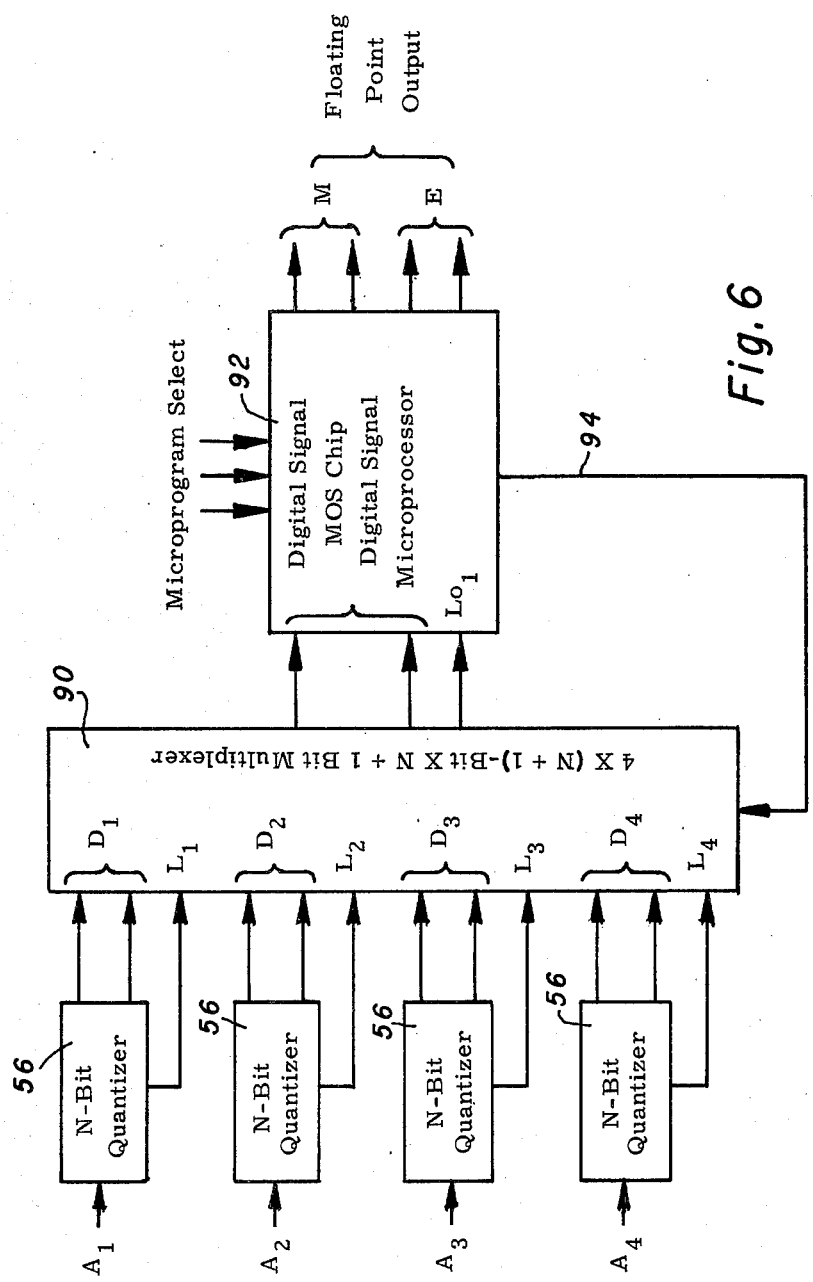
FIG. 6 is a block diagram of a Digital Signal Microprocessor incorporated in the data acquisition unit with a single floating point digital output.

In the preferred scheme of analog signal conditioning and A/D conversion, no analog switches are required. Four tracking type A/D converters are used. With the A/D system having four fixed-point digital outputs, one from each of the four quantizers 56, either the recording unit 42 must be capable of recording four fixed point outputs or a fixed-point to floating point conversion must be provided to compress the data to one floating point output, i.e., a mantissa and an exponent digital representation of the data. A single (compressed) floating point output is the preferred data recording format. The preferred method of compressing the four fixed point digital outputs of the quantizers 56 is illustrated in FIG. 6; wherein, the digital signals ($D_1$-$D_4$) together with a discrete signal ($L_1$-$L_4$) (used to indicate whether the quantizer is tracking the analog signal within the linear point of operation and is not saturated) of the quantizers are inputs to a $4\times(N+1)$ bit (input) to N+1 bit (output) multiplexer 90. The multiplexer 90 multiplexes or samples the digitized signals for a large scale integrated metal oxide semiconductor [LSI(MOS)] chip digital signal microprocessor 92 programmed to perform desired functions such as, for example, multiplex control through feedback conductor 94, editing and averaging the fixed point inputs, fixed point to floating point conversion, equalization and non-linear filtering (to compensate for transducer characteristics and unwanted induced signals), antialias filtering and resampling. The outputs of the microprocessor which may be in any desired format such as the typical format of a mantissa (M) and exponent (E) which combined (M+E) represent the processed floating point, are fed data recorder 42 (FIG. 2). The "3M DC300A Data Cartridge" manufactured by 3M Corporation is preferred as the data recorder 42.

The master control and collation system 24 for portable operation can be a manually programmed system which includes (FIG. 3) one or more radio frequency transmitter and receiver units 60 which may be selected from any of a number of FM transceivers 60 such as, for example, an RCA Personalfone 150 manufactured by Radio Corporation of America. The transceiver 60 has one connection to a voice communication unit 62 for two-way voice communications with the field crews deploying the acquisition units 12 and locating and operating the seismic source 20 along the source trajectory. The transceiver 60 is also connected to a manual controller 64, shown in dotted lines in FIG. 3, which is manually programmed to send coded signals to the acquisition units 12 and source 20. The coded signals include an on-off signal by acquisition unit identification for activating selected acquisition units 12, a signal for controlling tape movement in the data cartridge, a time-zero signal for correlating the activation of the source and establishing a time base for the data acquisition units, a sweep number code if a vibrator source is used to identify each source event on the tape, and a time-check signal near the end of the recording in the acquisition units 12. After recording the data for the shot point, the active data acquisition units 12 (FIG. 1) are placed in the inactive mode until all data acquisition units have been used. Then they are collected and re-used at other shot points.

Figure 3:
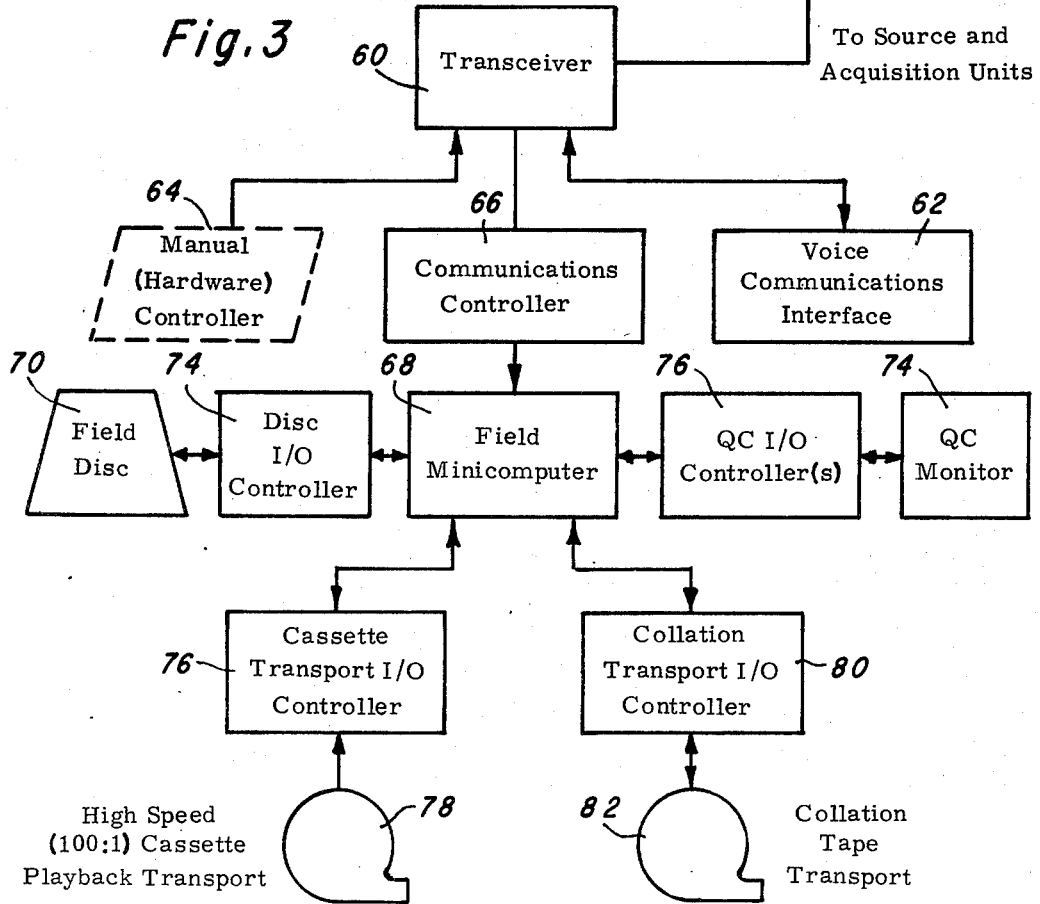
FIG. 3 is a block diagram of the master control for the data acquisition units and seismic source and collation unit.

To provide quality control for the data, the master control 24 (FIG. 3) can be made an integral part of a field correlating and collating system, and can be highly automated. To accomplish this feature the manual controller 64, shown in dotted lines in FIG. 3, is replaced by a communications controller 66. The communications controller 66 is responsive to a program of a field minicomputer 68 to provide the coded signals for the operation of the data acquisition units 12 and seismic source 20, and to provide the tape of the data cartridge with the necessary header information. The minicomputer 68 is a field type computer such as, for example, a Texas Instruments 980A computer manufactured by Texas Instruments Incorporated. The computer 68 has a field disk memory 70 addressable through a disk input-output controller 72, and a quality control monitor 74 having a quality control input-output controller 76. The input to the minicomputer 68 is through at least one data cartridge controller 76 to at least one high speed (at least 24:1 faster than real time recording speed) data cartridge transport. The output of minicomputer 68 is through a collation transport input-output controller 80 to a collation tape transport 82.

The playback must be faster than the recording speed by at least the active number of data acquisition units 12 operating concurrently which can vary from 24 to 60 or more. Thus, more than one high speed tape cartridge playback transport 78 may be required to keep the collation process from falling behind the field operation. The playback transport may be any type capable of meeting the above-mentioned requirement. The 3-M DC300A Data Cartridge can perform at ratios exceeding 180 to 1; the block size of this data cartridge is compatible with the work space in the computer, and the demultiplexed form of the recorded data is readily amenable to stacking and correlation processes. The data cartridge can be recorded up to 2500 times without degradation in performances at a packing density of 1600 bpi.

The minicomputer 68 can be package programmed to combine several processes to reduce the time and cost of processing raw data into typical seismic information. Thus, with multiple disks the data may be stacked and reassembled in a form for quality control and output. After checking the quality of the data the computer will record the header information in the desired format and the collated data.

As the structures involved in the distributed system are all in existence and within the knowledge of those skilled in the art, schematic diagrams of the circuits therefore are not included. Further, various changes can be made in the above constructions and inventions without departing from the scope of the invention as defined by the appended claims.

What is claimed is:
1. A system for land seismic exploration comprising:
   (a) a seismic source means for generating seismic energy in an elastic body;
   (b) a plurality of data acquisition units for detecting, partially processing, and recording the seismic energy emanating from the elastic body, each data acquisition unit including a seismic sensor responsive to seismic energy emanating from the elastic body to produce electrical representations thereof; a signal conditioning unit having an analog to digital system including a plurality of amplifier/quantizer stages bounded to prevent saturation and operatively coupled together with bit redundancy between adjacent stages for providing a full range of amplitude signals, and a data recorder means operatively connected to the data processor output for recording the partially processed data; and
   (c) a controller for controlling operation of the data acquisition units.

2. A system for land seismic exploration according to claim 1 wherein the recorder is a tape cartridge type recorder.

3. A system for land seismic exploration according to claim 1 wherein the recorder is a cassette type recorder.

4. A system for land seismic exploration according to claim 1 wherein the analog to digital converter has a million to one amplitude ratio between the largest and smallest encountered signals.

5. A system for land seismic exploration according to claim 1, further including a large scale integrated metal oxide semiconductor chip data processor responsive to the analog to digital output for performing selected seismic functions and for monitoring the analog to digital output.

6. A system for land seismic exploration according to claim 1 further including a master control means for actuating the controller to control the operation of data acquisition unit during different modes of operation.

7. A system for land seismic exploration according to claim 6 wherein the control means responsive to the master control means switches the data acquisition unit from a standby to active mode of operation to activate the recorder to record header information and the seismic data output of the data acquisition unit sensor.

8. A system for land seismic exploration according to claim 6 wherein the control means of the data acquisition unit further includes a receiver for receiving transmitted radio frequency signals from the master control means.

9. A system for land seismic exploration comprising:
(a) a seismic source means for generating seismic energy in an elastic body;
(b) a plurality of data acquisition units for detecting partially processing, and recording the seismic energy emanating from the elastic body, each data acquisition unit including a seismic sensor responsive to seismic energy emanating from the elastic body to produce electrical representations thereof; a signal conditioning unit responsive to the sensor for selecting and normalizing a desired signal for an analog to digital system, an analog to digital system connected to the signal conditioning unit, said analog to digital system including a plurality of amplifier to quantizer series branch circuits bounded to prevent saturation and connected in parallel with bit redundancy between adjacent branch circuits to form a parallel circuit in series with the snesor for providing a desired full range system, a data recorder means operatively connected to the output of the analog to digital system for recording the partially processed data; and
(c) a controller for controlling operation of the data acquisition units.

10. A system for land seismic exploration comprising:
(a) a seismic source means for generating seismic energy in an elastic body;
(b) a plurality of data acquisition units for detecting, partially processing, and recording seismic energy emanating from the elastic body, each data acquisition unit including a seismic sensor responsive to seismic energy emanating from the elastic body to produce electrical representations thereof; a signal conditioning unit responsive to the sensor for selecting and nomalizing a desired signal for an analog to digital system, an analog to digital system connected to the signal conditioning unit, said analog to digital system including a plurality of serially connected amplifiers bounded to prevent saturation and coupled in series to the sensor, and a plurality of quantizers each of said quantizers coupled to an output of a corresponding bounded amplifier with bit redundancy between adjacent quantizers for producing a desired full range system, a data recorder means operatively connected to the output of the analog to digital system for recording the partially processed data; and
(c) a controller for controlling operation of the data acquisition units.

* * * * *